United States Patent
Zhou et al.

(10) Patent No.: US 11,480,443 B2
(45) Date of Patent: Oct. 25, 2022

(54) METHOD FOR CALIBRATING RELATIVE POSE, DEVICE AND MEDIUM

(71) Applicant: BAIDU ONLINE NETWORK TECHNOLOGY (BEIJING) CO., LTD., Beijing (CN)

(72) Inventors: Xun Zhou, Beijing (CN); Yuanfan Xie, Beijing (CN); Shirui Li, Beijing (CN); Liang Wang, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 498 days.

(21) Appl. No.: 16/582,754

(22) Filed: Sep. 25, 2019

(65) Prior Publication Data
US 2020/0103249 A1  Apr. 2, 2020

(30) Foreign Application Priority Data
Sep. 27, 2018 (CN) .......................... 201811133716.3

(51) Int. Cl.
  *G01C 25/00* (2006.01)
  *G01S 7/497* (2006.01)
  (Continued)

(52) U.S. Cl.
  CPC .......... *G01C 25/00* (2013.01); *G01C 21/005* (2013.01); *G01S 7/4972* (2013.01); *G01S 17/89* (2013.01);
  (Continued)

(58) Field of Classification Search
  CPC ..... G01C 25/00; G01C 21/005; G01S 7/4972; G01S 17/89; G05D 1/021; G05D 2201/0213
  (Continued)

(56) References Cited

U.S. PATENT DOCUMENTS 9,286,538 B1 * 3/2016 Chen .................... G06V 20/647
9,523,772 B2 * 12/2016 Rogan .................... G01S 17/50
(Continued)

FOREIGN PATENT DOCUMENTS

CN  105953798 A      9/2016
CN  106405555   *   2/2017 ........... G01S 13/865
(Continued)

OTHER PUBLICATIONS

Office Action for Chinese Application No. 201811133716.3, dated Apr. 28, 2020, 12 pages.
(Continued)

*Primary Examiner* — Gertrude Arthur Jeanglaude
(74) *Attorney, Agent, or Firm* — Fay Sharpe LLP (57) ABSTRACT

Embodiments of the present disclosure disclose a method for calibrating a relative pose, a device, and a medium. The method includes: obtaining first point cloud data of a scene collected by the laser radar in an automatic driving mobile carrier and first pose data collected by the navigation positioning system in the automatic driving mobile carrier; and determining the relative pose between the laser radar and the navigation positioning system based on the first point cloud data, the first pose data, second point cloud data pre-collected by a laser scanner in the scene and second pose data pre-collected by a positioning device in the scene.

15 Claims, 4 Drawing Sheets

(51) Int. Cl.
  *G01C 21/00* (2006.01)
  *G01S 17/89* (2020.01)
  *G05D 1/02* (2020.01)

(52) U.S. Cl.
  CPC ..... *G05D 1/021* (2013.01); *G05D 2201/0213* (2013.01)

(58) Field of Classification Search
  USPC ........................................................ 701/445
  See application file for complete search history.

(56) References Cited

U.S. PATENT DOCUMENTS

| | | | |
|---|---|---|---|
| 2015/0268058 A1 | 9/2015 | Samarasekera et al. | |
| 2017/0371348 A1 | 12/2017 | Mou | |
| 2019/0011566 A1* | 1/2019 | Yan | G06V 20/58 |

FOREIGN PATENT DOCUMENTS

| | | |
|---|---|---|
| CN | 106405555 A | 2/2017 |
| CN | 106918830 A | 7/2017 |
| CN | 108337915 A | 7/2018 |
| CN | 108401461 A | 8/2018 |
| EP | 2990828 A1 | 3/2016 |
| GB | 2507560 A8 | 5/2014 |
| JP | 2002-031528 A | 1/2002 |
| JP | 2016-045150 A | 4/2016 |
| WO | 2013045927 A1 | 4/2013 |

OTHER PUBLICATIONS

Search Report for European Application No. 19200075.0, dated Jun. 3, 2020, 10 pages.
Office Action for Japanese application No. 2019-177449, dated Nov. 4, 2020, 4 pages.
Translation of Office Action for Japanese application No. 2019-177449, dated Nov. 4, 2020, 4 pages.

* cited by examiner

METHOD FOR CALIBRATING RELATIVE POSE, DEVICE AND MEDIUM

CROSS-REFERENCE TO RELATED APPLICATION

This application claims priority to and benefits of Chinese Patent Application Serial No. 201811133716.3, filed with the State Intellectual Property Office of P. R. China on Sep. 27, 2018, the entire content of which is incorporated herein by reference.

FIELD

Embodiments of the present disclosure relate to a field of computer technologies, and more particularly to a method for calibrating a relative pose, a device, and a medium.

BACKGROUND

With development of the sensor technology and the navigation positioning technology, both a laser radar and a navigation positioning system (the navigation positioning system is also referred to as an integrated navigation system) are generally used in a solution for making a high-precision map.

Presently, during making the high-precision map based on the laser radar and the navigation positioning system, there is a strict requirement in accuracy of external parameters of 6 degrees of freedom between the laser radar and the navigation positioning system, i.e. three translations and three rotations.

SUMMARY

Embodiments of the present disclosure provide a method for calibrating a relative pose between a laser radar and a navigation positioning system. The method includes:

obtaining first point cloud data of a scene collected by the laser radar in an automatic driving mobile carrier and first pose data collected by the navigation positioning system in the automatic driving mobile carrier; and determining the relative pose between the laser radar and the navigation positioning system based on the first point cloud data, the first pose data, second point cloud data pre-collected by a laser scanner in the scene and second pose data pre-collected by a positioning device in the scene.

Embodiments of the present disclosure also provide an apparatus for calibrating a relative pose between a laser radar and a navigation positioning system. The apparatus includes: a data obtaining module and a relative pose determining module.

The data obtaining module is configured to obtain first point cloud data of a scene collected by the laser radar in an automatic driving mobile carrier, and first pose data collected by the navigation positioning system in the automatic driving mobile carrier.

The relative pose determining module is configured to determine the relative pose between the laser radar and the navigation positioning system based on the first point cloud data, the first pose data, second point cloud data pre-collected by a laser scanner in the scene and second pose data pre-collected by a positioning device in the scene.

Embodiments of the present disclosure also provide a device. The device includes one or more processors, and a storage device. The storage device is configured to store one or more programs. When the one or more programs are executed by the one or more processors, the one or more processors are caused to implement the method for calibrating a relative pose between a laser radar and a navigation positioning system according to the first aspect.

Embodiments of the present disclosure also provide a medium having a computer program stored thereon. The program is configured to implement the method for calibrating a relative pose between a laser radar and a navigation positioning system according to the first aspect when being executed by a processor.

BRIEF DESCRIPTION OF THE DRAWINGS

In order to more clearly illustrate technical solutions in embodiments of the present disclosure, a brief description of accompanying drawings used in embodiments is given below. It should be understood that, the accompanying drawings below merely illustrate some embodiments of the present disclosure, and are therefore not considered as a limitation for the scope of the present disclosure. For those skilled in the art, other relative accompanying drawings may be obtained according to these accompanying drawings without creative labor.

DETAILED DESCRIPTION

Detailed description will be further made below to the present disclosure with reference to the accompanying drawings and the embodiments. It should be understood that, detailed embodiments described herein are intended only to explain the present disclosure, and are not intended to limit the present disclosure. In addition, it should be further noted that, for the convenience of description, only some contents but not all of the structure related to the present disclosure are illustrated in the accompanying drawings.

It should be noted that, the similar numerals and letters indicate similar items in the accompanying drawings below. Therefore, once an item is defined in an accompanying drawing, it is not required to further define and explain the item in the subsequent accompanying drawings. In the description of the present disclosure, terms such as "first" and "second" are used for distinguishing description and are not understood to indicate or imply relative importance or significance.

Presently, during making the high-precision map based on the laser radar and the navigation positioning system, there is a strict requirement in accuracy of external parameters of 6 degrees of freedom between the laser radar and the navigation positioning system, i.e. three translations and three rotations. However, an unmanned vehicle may merely drive on one ground plane. Therefore, there is no limitation for a vertical direction in data collected by the laser radar and the navigation positioning system, thus resulting in that a conventional calibration algorithm may not calibrate a relative pose between the laser radar and the navigation positioning system accurately. T Embodiments of the present disclosure provide a method and an apparatus for calibrating a relative pose, a device, and a medium.

Embodiment 1

Figure 1:
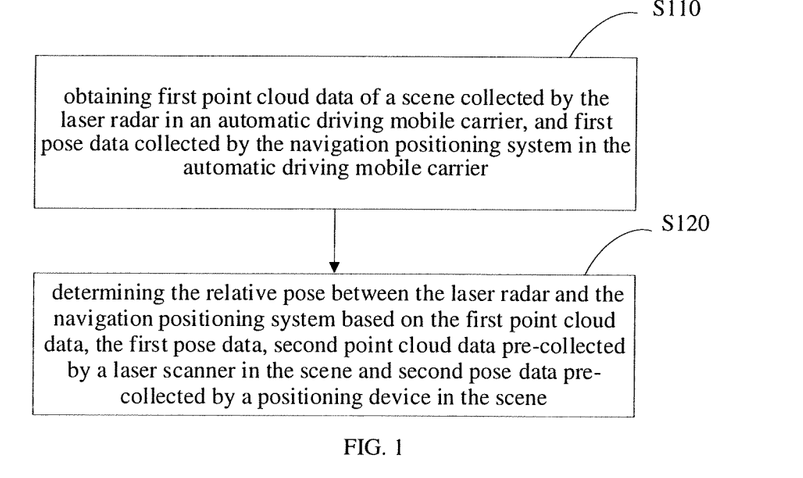
FIG. 1 is a flow chart illustrating a method for calibrating a relative pose between a laser radar and a navigation positioning system in Embodiment 1 of the present disclosure.

FIG. 1 is a flow chart illustrating a method for calibrating a relative pose between a laser radar and a navigation positioning system in Embodiment 1 of the present disclosure. This embodiment may be applicable to a case where a relative pose between a laser radar and a navigation positioning system is calibrated accurately. The method may be executed by an apparatus for calibrating a relative pose between a laser radar and a navigation positioning system in embodiments of the present disclosure. The apparatus may be implemented in form of software and/or hardware. The apparatus may be configured in an automatic driving mobile carrier such as an automatic driving vehicle. Referring to FIG. 1, the method includes following blocks.

At block S110, first point cloud data of a scene collected by the laser radar in an automatic driving mobile carrier, and first pose data collected by the navigation positioning system in the automatic driving mobile carrier are obtained.

The automatic driving mobile carrier is an unmanned driving mobile device, which may be an automatic driving vehicle. The point cloud data refers to a point set composed of a group of points including three-dimensional coordinates, which may be used to represent an outer surface shape of an object. Three-dimensional geometry position information of each point may be represented by (x, y, z). In addition, the point cloud data may also represent an RGB color, a gray scale value, a depth, and a division result of a point. In this embodiment, the first point cloud data refers to point cloud data of a driving road scene collected by the laser radar in the automatic driving mobile carrier, which may include point cloud data of objects on the road such as trees, lights, vehicles and the like, and point cloud data of a road surface, and the like.

The navigation positioning system is composed of at least one unit or system having a positioning function, for example, composed of at least one of an inertial navigation system (INS), an inertial measurement unit (IMU), a global positioning system (GPS), and a BeiDou navigation satellite system (BDS). It should be noted that, positioning accuracy of the navigation positioning system composed of a plurality of units or systems having the positioning function is greater than an individual positioning unit or system. The navigation positioning system may collect information such as a position, a pose, a velocity, and an accelerated velocity of an object. In this embodiment, the first pose data refers to positioning data collected by the navigation positioning system in the automatic driving mobile carrier, which may include a position and a pose, i.e., translation measurements and rotation measurements in three dimensions.

It should be noted that, since both the laser radar and the navigation positioning system are provided in the automatic driving mobile carrier, the navigation positioning system may also obtain the positioning data of the scene while the laser radar collects point cloud data of the same scene. In other words, the first point cloud data and the first pose data are collected simultaneously. Therefore, in the same scene, the first point cloud data is associated with the first pose data, and each point cloud in the first point cloud data has corresponding first pose data.

In detail, when the automatic driving mobile carrier is driving on a certain road, the road scene is scanned by the laser radar provided in the mobile carrier, to obtain first point cloud data of the road scene. Simultaneously, first pose data of the road scene is collected by the navigation positioning system provided in the mobile carrier.

At block S120, the relative pose between the laser radar and the navigation positioning system is determined based on the first point cloud data, the first pose data, second point cloud data pre-collected by a laser scanner in the scene and second pose data pre-collected by a positioning device in the scene.

The laser scanner is a laser scanning device having a positioning function with high accuracy, such as a Riegl laser scanner. The positioning device refers to a device configured to collect positioning data of an object. The laser scanner in this embodiment may be rigidly connected to the positioning device through a specific interface. In other words, the relative pose between the laser scanner and the positioning device is certain. The data collected by the laser scanner and the positioning device is employed as a reference. The second point cloud data and the second pose data may be obtained in advance in the same scene where the laser radar collects the first point cloud data. In the same scene, the second point cloud data is associated with the second pose data, and each point cloud in the second point cloud data has corresponding second pose data.

The relative pose may include a relative height difference in the z-axis direction, and may also include a translation amount and a rotation angle in the x-axis direction and the y-axis direction.

In detail, taking the second point cloud data collected by the laser scanner and the second pose data collected by the positioning device as a reference, and based on a predetermined conversion rule, the first point cloud data collected by the laser radar and the first pose data collected by the navigation positioning system are converted to a same coordinate system. Pose data of the laser radar and the navigation positioning system in the same coordinate system is respectively extracted. The relative pose between the laser radar and the navigation positioning system is determined based on a height of the laser radar and the pose data of the navigation positioning system. The relative pose between the laser radar and the navigation positioning system may be calibrated accurately based on the relative pose. The conversion rule may include a conversion algorithm among different coordinate systems, and may also include a conversion algorithm among different point sets in the same coordinate system.

With the technical solution provided in embodiments of the present disclosure, by taking the second point cloud data collected by the laser scanner in the scene and the second pose data collected by the positioning device in the scene as a reference, and based on a correspondence relationship between the first point cloud data collected by the laser radar in the automatic driving mobile carrier, the second point cloud data, the first pose data collected by the navigation positioning system in the automatic driving mobile carrier and the second pose data, the relative pose between the laser radar and the navigation positioning system may be determined. In this way, the relative pose between the laser radar and the navigation positioning system may be calibrated accurately, and a new method is provided for calibrating the relative pose between the laser radar and the navigation positioning system.

Embodiment 2

Figure 2:
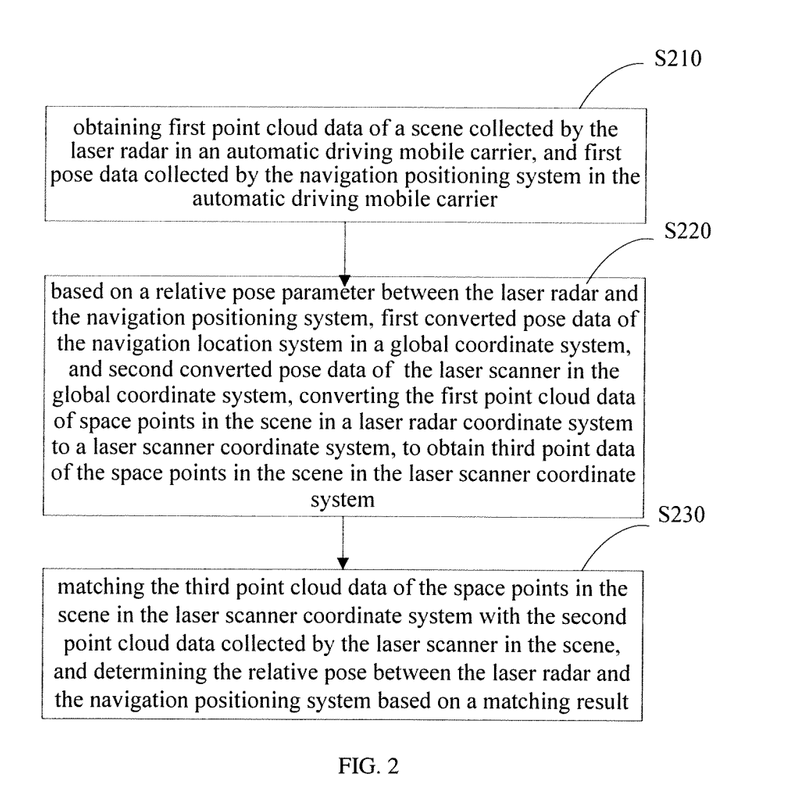
FIG. 2 is a flow chart illustrating a method for calibrating a relative pose between a laser radar and a navigation positioning system in Embodiment 2 of the present disclosure.

FIG. 2 is a flow chart illustrating a method for calibrating a relative pose between a laser radar and a navigation positioning system in Embodiment 2 of the present disclosure. This embodiment, based on the above embodiment, provides a method for determining a relative pose between the laser radar and the navigation positioning system according to the first point cloud data, the first pose data, the second point cloud data pre-collected by the laser scanner in the scene and the second pose data pre-collected by the positioning device in the scene. As illustrated in FIG. 2, the method in this embodiment includes following blocks.

At block S210, first point cloud data of a scene collected by the laser radar in an automatic driving mobile carrier, and first pose data collected by the navigation positioning system in the automatic driving mobile carrier are obtained.

At block S220, first point cloud data of space points in the scene in a laser radar coordinate system is converted to a laser scanner coordinate system based on a relative pose parameter between the laser radar and the navigation positioning system, first converted pose data of the navigation positioning system in a global coordinate system, and second converted pose data of the laser scanner in the global coordinate system, to obtain third point data of the space points in the scene in the laser scanner coordinate system.

The relative pose parameter refers to a variation for describing a change of the relative pose. The global coordinate system is also referred to as the world coordinate system, which refers to an absolute coordinate system of a system. Coordinates of all points in an image are determined by taking an origin of the global coordinate system as a reference before a user coordinate system is established. The first converted pose data is obtained by converting the first pose data collected by the navigation positioning system in the automatic driving mobile carrier to the global coordinate system. Correspondingly, the second pose data collected by the positioning device may be converted to the global coordinate system to obtain the second converted pose data of the positioning device in the global coordinate system. There is a rigidly connection relationship between the laser scanner and the positioning device. Therefore, the second converted pose data of the laser scanner in the global coordinate system may be determined by aid of the second converted pose data of the positioning device in the global coordinate system. For example, the second converted pose data of the laser scanner in the global coordinate system may be determined as follows. The second converted pose data of the laser scanner in the global coordinate system is determined according to the second pose data of the scene collected by the positioning device in the positioning device coordinate system, and the relative pose between the positioning device and the laser scanner.

It should be noted that, the point cloud data collected by the laser radar in the scene may include information in a plurality of dimensions, such as space dimension, time dimension and the like. The time dimension information has a lower influence on determining the relative pose between the laser radar and the navigation positioning system, which may be ignored. Therefore, in this embodiment, only the space dimension information in the scene needs to be considered.

In detail, since the relative pose between the laser scanner and the positioning device is certain, the first point cloud data collected by the laser radar may be converted to the laser scanner coordinate system or the positioning device coordinate system, and the relative pose between the laser radar and the navigation positioning system is calculated based on a certain amount. In this embodiment, the first point cloud data collected by the laser radar is converted to the laser scanner coordinate system, to obtain the third point cloud data. In detail, first converted point cloud data of the laser radar in the global coordinate system may be obtained based on the relative pose parameter between the laser radar and the navigation positioning system and the first converted pose data of the navigation positioning system in the global coordinate system. A conversion relationship between the global coordinate system and the laser scanner coordinate system may be obtained based on second converted pose data of the laser scanner in the global coordinate system. The third point cloud data in the laser scanner coordinate system is obtained based on the first converted point cloud data of the laser radar in the global coordinate system and the second converted pose data of the laser scanner in the global coordinate system, in which, the third point cloud data is obtained by converting the first point cloud data of the space points collected by the laser radar in the scene.

At block S230, the third point cloud data of the space points in the scene in the laser scanner coordinate system is matched with the second point cloud data collected by the laser scanner in the scene, and the relative pose between the laser radar and the navigation positioning system is determined based on a matching result.

In detail, offline registration may be performed on the third point cloud data of space points in the scene in the laser scanner coordinate system and the second point cloud data collected by the laser scanner in the scene by using an iterative closest point (ICP) algorithm or a genetic iterative closest points (GICP) algorithm. In a case where any one of a distance, a distance mean value, and a distance variance between the third point cloud data and the second point cloud data is minimum, a value of the determined relative pose parameter between the laser radar and the navigation positioning system is the relative pose between the laser radar and the navigation positioning system.

For example, the relative pose parameter between the laser radar and the navigation positioning system is T, the first point cloud data collected by the laser radar in the scene is X, the first converted pose data of the navigation positioning system in the global coordinate system is P, the second converted pose data of the laser scanner in the global coordinate system is R, and the third point cloud data in the laser radar scanner coordinate system converted from the first point cloud data of the space points in the scene collected by the laser radar is $X'$, then $X'$ may be represented as: $X'=R*P*T*X$. Iterative registration is performed on X and $X'$ by employing the ICP algorithm. When there is a smallest distance between X and V, T is obtained as the relative pose between the laser radar and the navigation positioning system.

With the technical solution provided in embodiments, by taking the second point cloud data collected by the laser scanner in the scene and the second pose data collected by the positioning device in the scene as a reference, and based on a correspondence relationship between the first point cloud data collected by the laser radar in the automatic driving mobile carrier, the second point cloud data, the first pose data collected by the navigation positioning system in the automatic driving mobile carrier and the second pose data, the relative pose between the laser radar and the navigation positioning system may be determined. In this way, the relative pose between the laser radar and the navigation positioning system may be calibrated accurately, and a new method is provided for calibrating the relative pose between the laser radar and the navigation positioning system.

Embodiment 3

Figure 3:
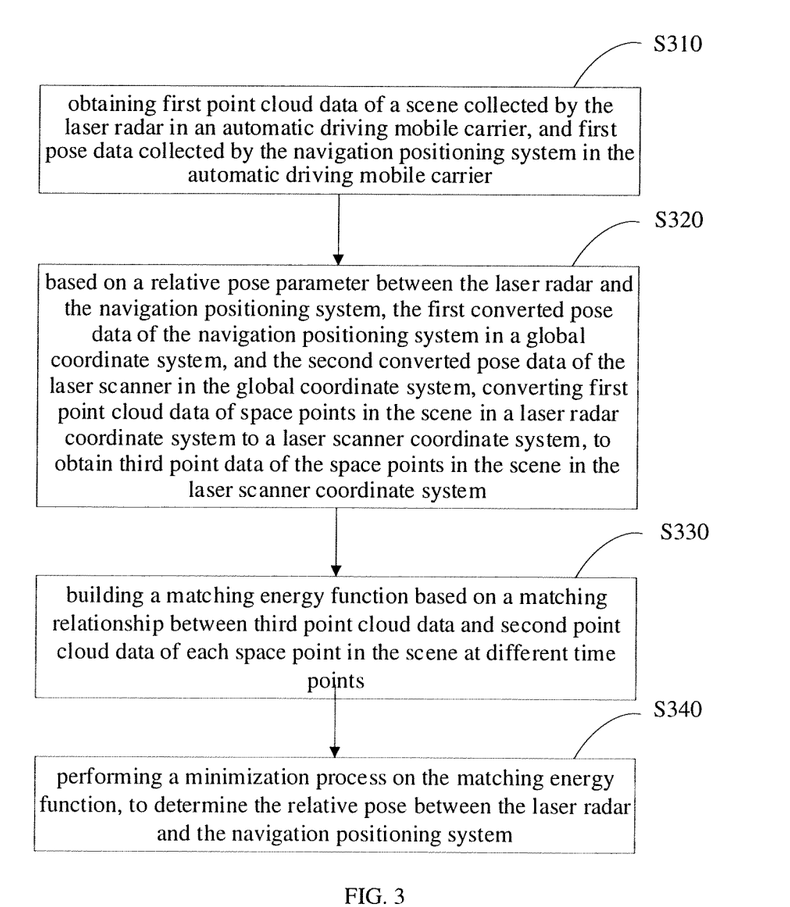
FIG. 3 is a flow chart illustrating a method for calibrating a relative pose between a laser radar and a navigation positioning system in Embodiment 3 of the present disclosure.

FIG. 3 is a flow chart illustrating a method for calibrating a relative pose between a laser radar and a navigation positioning system in Embodiment 3 of the present disclosure. This embodiment, based on the above embodiment, provides a further illustration on a method for determining a relative pose between the laser radar and the navigation positioning system according to the first point cloud data, the first pose data, the second point cloud data pre-collected by the laser scanner in the scene and the second pose data pre-collected by the positioning device in the scene. As illustrated in FIG. 3, the method in this embodiment includes following blocks. At block S310, first point cloud data of a scene collected by the laser radar in an automatic driving mobile carrier, and first pose data collected by the navigation positioning system in the automatic driving mobile carrier are obtained.

At block S320, first point cloud data of space points in the scene in a laser radar coordinate system is converted to a laser scanner coordinate system based on a relative pose parameter between the laser radar and the navigation positioning system, first converted pose data of the navigation positioning system in a global coordinate system, and second converted pose data collected of the laser scanner in the global coordinate system, to obtain third point data of the space points in the scene in the laser scanner coordinate system.

At block S330, a matching energy function is built based on a matching relationship between third point cloud data and second point cloud data of each space point in the scene at different time points.

The matching energy function may be configured to represent a distance mean value between the third point cloud data and the second point cloud data.

In detail, registration may be performed on the third point cloud data and second point cloud data of each space point in the scene at different time points by employing the ICP algorithm or GICP algorithm, thus building a matching error function of the distance between the third point cloud data and the second point cloud data. The matching energy function is obtained by solving the mean value based on the matching error function.

For example, the matching error function may be represented by error, the matching energy function may be represented by E, then $$E = \frac{1}{n} \sum_{i}^{n}$$

error. n represents a number of points in the space, and i represents the $i^{-th}$ point cloud data.

At block S340, a minimization process is performed on the matching energy function, to determine the relative pose between the laser radar and the navigation positioning system.

The minimization process refers to a way of solving the matching energy function to enable it to take a minimum value. For example, the minimization process may be performed by employing a least squares method, a limit method or the like. The way for performing the minimization process on the matching energy function is not limited in this embodiment, as long as the matching energy function may take the minimum value.

In detail, the minimization process may be performed on the matching energy function by employing the least squares method, the limit method or the like. When the matching energy function takes the minimum value, the value of the relative pose parameter between the laser radar and the navigation positioning system is the relative pose between the laser radar and the navigation positioning system.

With the technical solution provided in embodiments of the present disclosure, by taking the second point cloud data collected by the laser scanner in the scene and the second pose data collected by the positioning device in the scene as a reference, and based on a correspondence relationship between the first point cloud data collected by the laser radar in the automatic driving mobile carrier, the second point cloud data, the first pose data collected by the navigation positioning system in the automatic driving mobile carrier and the second pose data, the relative pose between the laser radar and the navigation positioning system may be determined. In this way, the relative pose between the laser radar and the navigation positioning system may be calibrated accurately, and a new method is provided for calibrating the relative pose between the laser radar and the navigation positioning system.

When there is a need to obtain a relative height difference in the relative pose between the laser radar and the navigation positioning system, for example, matching the third point cloud data of the space points in the scene in the laser scanner coordinate system with the second point cloud data collected by the laser scanner in the scene, and determining the relative pose between the laser radar and the navigation positioning system based on the matching result, may also include following steps A and B.

At step A, the third point cloud data of the space points in the scene in the laser scanner coordinate system is matched with the second point cloud data collected by the laser scanner in the scene, to determine a coincidence point set between the third point cloud data and the second point cloud data.

The coincidence point set between the third point cloud data and the second point cloud data refers to a point set composed of a same part between the third point cloud data and the second point cloud data, which may be an intersection between the third point cloud data and the second point cloud data. In detail, the coincidence point set between the third point cloud data and the second point cloud data may be determined according to feature point matching.

Since the point cloud data includes point cloud data of all objects scanned by laser in the scene, for reducing calculation amount, any fixed position having a representative object in the scene, such as a road, may be selected to calibrate a height difference between the laser radar and the navigation positioning system. Preferably, in this embodiment, a coincidence point set of the third point cloud data and the second point cloud data corresponding to the road in the scene is used as the coincidence point set of the third point cloud data and the second point cloud data of the scene.

At step B, the height difference between the laser radar and the navigation positioning system is determined according to the first pose data associated with the coincidence point set and the second pose data associated with the coincidence point set.

In detail, according to the first pose data associated with the coincidence point set and the second pose data associated with the coincidence point set, the coincidence point set is converted to the same coordinate system based on the first pose data and the second pose data. The heights i.e., z values of the laser radar and the navigation positioning system in the coordinate system are respectively extracted. The height difference between the laser radar and the navigation positioning system is obtained based on the height of the laser radar and the height of the navigation positioning system. The height of the laser radar and the height of the navigation positioning system may be calibrated accurately based on the height difference.

Embodiment 4

Figure 4:
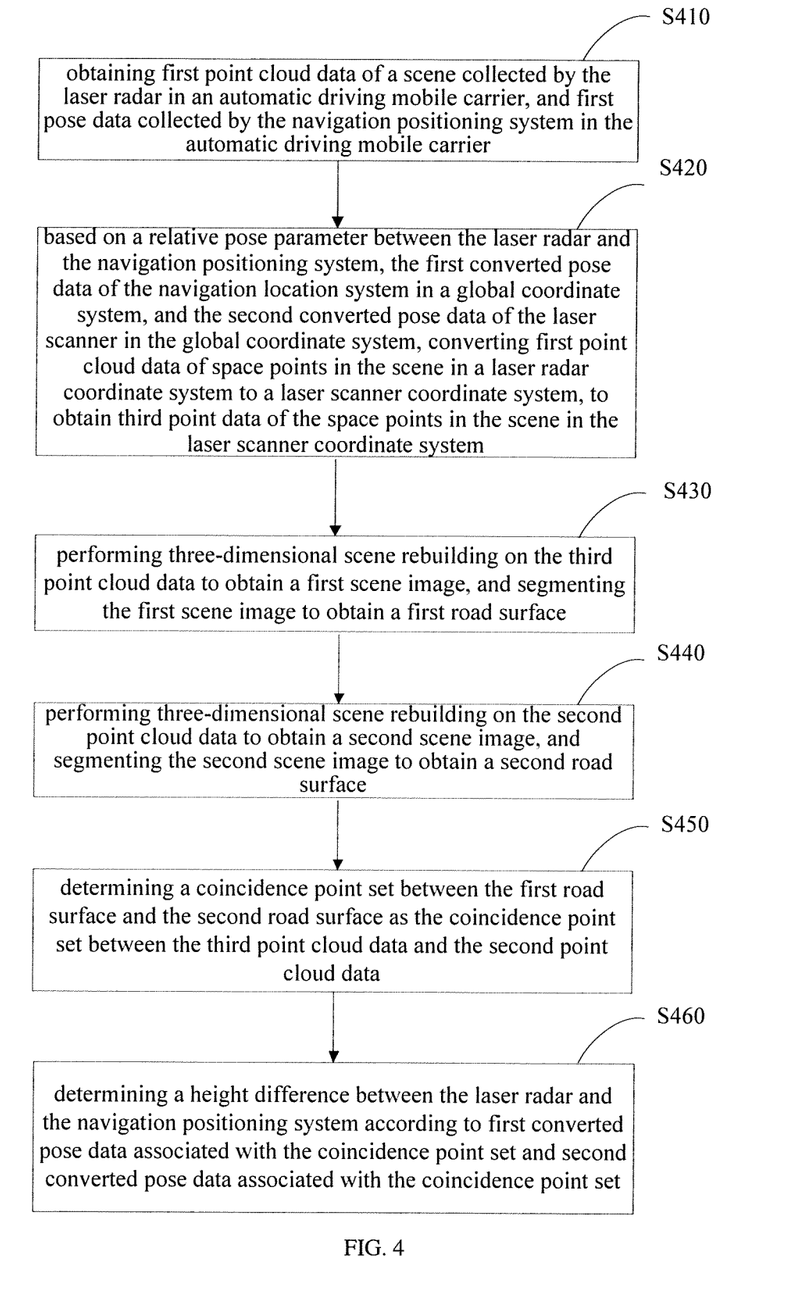
FIG. 4 is a flow chart illustrating a method for calibrating a relative pose between a laser radar and a navigation positioning system in Embodiment 4 of the present disclosure.

FIG. 4 is a flow chart illustrating a method for calibrating a relative pose between a laser radar and a navigation positioning system in Embodiment 4 of the present disclosure. This embodiment, based on the above embodiment, provides illustration on a method for determining a relative pose between the laser radar and the navigation positioning system according to the first point cloud data, the first pose data, the second point cloud data pre-collected by the laser scanner in the scene and the second pose data pre-collected by the positioning device in the scene. As illustrated in FIG. 4, the method in this embodiment includes following blocks.

At block S410, first point cloud data of a scene collected by the laser radar in an automatic driving mobile carrier, and first pose data collected by the navigation positioning system in the automatic driving mobile carrier are obtained.

At block S420, first point cloud data of space points in the scene in a laser radar coordinate system is converted to a laser scanner coordinate system based on a relative pose parameter between the laser radar and the navigation positioning system, the first converted pose data of the navigation positioning system in a global coordinate system, and second converted pose data of the laser scanner in the global coordinate system, to obtain third point data of the space points in the scene in the laser scanner coordinate system.

At block S430, three-dimensional scene rebuilding is performed on the third point cloud data to obtain a first scene image, and the first scene image is segmented to obtain a first road surface. The three-dimensional scene rebuilding refers to perform point cloud fusion on the third point cloud data, to reproduce a road scene. The fusion of the point cloud data may be performed by employing the ICP algorithm. The fusion of the point cloud data may also be performed based on real-time positioning data such as GPS data. The first scene image refers to a three-dimensional scene image (i.e. a three-dimensional point cloud image) obtained by performing the three-dimensional scene rebuilding based on the third point cloud data in the laser scanner coordinate system obtained by converting the first point cloud data collected by the laser radar.

The first road surface in the three-dimensional scene may also be referred to as the first road surface point cloud, which is formed by the point cloud data of the road. For example, the first road surface may be obtained by: (1) determining a point cloud segmentation threshold based on the first scene image, the third point cloud data and the like, performing segmentation on the first scene image based on the point cloud segmentation threshold, and removing point cloud data, such as, trees, lights, vehicles and the like, other than road surface in the road scene from the third point cloud data, to obtain the first road surface; (2) performing segmentation on the first scene image in a modeling way to obtain the first road surface, for example, extracting the first road surface directly from the first scene image by employing a Gaussian mixed background model; (3) performing segmentation on the first scene image by employing other algorithm, such as, a RANSAC (random sample consensus) algorithm, to obtain the first road surface.

In detail, the fusion of the point cloud data is performed by employing the ICP algorithm based on the collected third point cloud data, actual road information and the like, to obtain the first scene image. The point cloud segmentation threshold is determined based on the first scene image, the third point cloud data and the like. The segmentation is performed on the first scene image based on the point cloud segmentation threshold. The point cloud data, such as, trees, lights, vehicles and the like, other than road surface in the road scene is removed from the third point cloud data, to obtain the first road surface.

At block S440, three-dimensional scene rebuilding is performed on the second point cloud data to obtain a second scene image, and the second scene image is segmented to obtain a second road surface.

The second scene image refers to a three-dimensional scene image obtained by performing the three-dimensional scene rebuilding based on the second point cloud data collected by the laser radar. It should be noted that, since he first scene image and the second scene image are obtained by performing the three-dimensional scene rebuilding on the point cloud data collected by different laser scanners in the same scene, and different laser scanners have different precisions there may be different parts between the first scene image and the second scene image, or the first scene image may be same as the second scene image.

The second road surface in the three-dimensional scene may also be referred to as second road surface point cloud, which is obtained by performing segmentation on the second scene image. In detail, the second road surface may be obtained by employing the same implementation as the above block S430.

In detail, the fusion of the point cloud data is performed by employing the ICP algorithm based on the collected second point cloud data, actual road information and the like, to obtain the second scene image. The point cloud segmentation threshold is determined based on the second scene image, the second point cloud data and the like. The segmentation is performed on the second scene image based on the point cloud segmentation threshold. The point cloud data, such as, trees, lights, vehicles and the like, other than road surface in the road scene is removed from the second point cloud data, to obtain the second road surface.

At block S450, a coincidence point set between the first road surface and the second road surface is determined as the coincidence point set between the third point cloud data and the second point cloud data.

The coincidence point set between the first road surface and the second road surface refers to a set of point cloud data corresponding to a coincidence area obtained by matching the first road surface with the second road surface.

In detail, a feature matching is performed between the first road surface and the second road surface, the coincidence area between the first road surface and the second road surface is determined based on a feature matching relationship, and the set of the point cloud data corresponding to the coincidence area is used as the coincidence point set between the first road surface and the second road surface. In order to reduce calculation amount, the coincidence point set may be used as the coincidence point set between the third point cloud data and the second point cloud data.

At block S460, a height difference between the laser radar and the navigation positioning system is determined according to first converted pose data associated with the coincidence point set and second converted pose data associated with the coincidence point set.

The first converted pose data is pose data of the navigation positioning system in the global coordinate system. The converted second pose data is pose data of the laser scanner in the global coordinate system.

In detail, the second converted pose data associated with the coincidence point set may be determined based on the coincidence point set. A conversion relationship between the laser scanner coordinate system and the global coordinate system may be obtained based on the converted second pose data of the laser scanner in the global coordinate system. The coincidence point set is converted into the global coordinate system based on the conversion relationship, and z value is extracted in the global coordinate system as the height of the laser radar. The first converted pose data associated with the coincidence point set is determined based on the coincidence point set, and z value is extracted in the global coordinate system as the height of the navigation positioning system.

Or, the first converted pose data associated with the coincidence point set may be determined based on the coincidence point set. A conversion relationship between the laser scanner coordinate system and the global coordinate system may be obtained based on the second converted pose data of the laser scanner in the global coordinate system. The first converted pose data associated with the coincidence point set is converted into the laser scanner coordinate system based on the conversion relationship, and z value is extracted in the laser scanner coordinate system as the height of the navigation positioning system. The coincidence point set is a coincidence point set between the laser radar and laser scanner in the laser scanner coordinate system. Therefore, based on the coincidence point set, z value, i.e. a height of the laser radar, is extracted in the laser scanner coordinate system.

A difference value between the height of the laser radar in the global coordinate system and the height of the navigation positioning system in the global coordinate system is determined, and the difference value is taken as the height difference between the laser radar and the navigation positioning system, i.e., a difference value relative to the same road surface between the laser radar and the navigation positioning system.

With the technical solution provided in embodiments of the present disclosure, the three-dimensional scene rebuilding is performed respectively on the third point cloud data in the laser scanner coordinate system obtained by converting the first point cloud data collected by the laser radar in the automatic driving mobile carrier and on the second point cloud data collected by the laser scanner in the same scene, to obtain the first scene image and the second scene image, and the first road surface and the second road surface are determined respectively based on the first scene image and the second scene image. The coincidence point set between the third point cloud data and the second point cloud data may be determined based on the coincidence point set between the first road surface and the second road surface. The coincidence point set is converted into the same coordinate system through the first converted pose data and the second converted pose data according to the first converted pose data associated with the coincidence point set and the second converted pose data associated with the coincidence point set. The heights of the laser radar and the navigation positioning system in the same coordinate system are respectively extracted. The height difference between the laser radar and the navigation positioning system is obtained based on the heights of the laser radar and the navigation positioning system. The calibration for the height between the laser radar and the navigation positioning system may be implemented accurately based on the height difference. The technical solution provides a new method for calibrating the height between the laser radar and the navigation positioning system.

Embodiment 5

Figure 5:
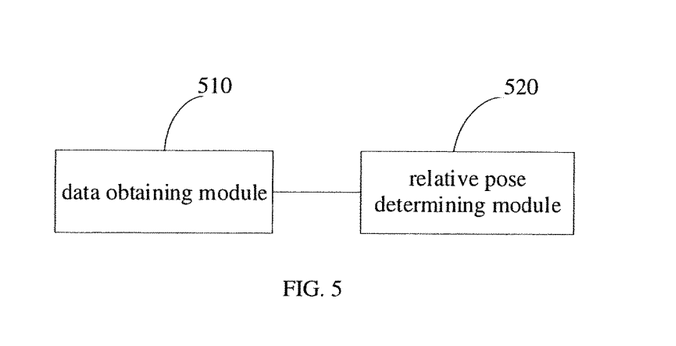
FIG. 5 is a block diagram illustrating an apparatus for calibrating a relative pose between a laser radar and a navigation positioning system in Embodiment 5 of the present disclosure.

FIG. 5 is a block diagram illustrating an apparatus for calibrating a relative pose between a laser radar and a navigation positioning system in Embodiment 5 of the present disclosure. The apparatus may execute a method for calibrating a relative pose between a laser radar and a navigation positioning system according to any of embodiments of the present disclosure, and has corresponding function modules executing the method and beneficial effects. As illustrated in FIG. 5, the apparatus includes: a data obtaining module 510 and a relative pose determining module 520.

The data obtaining module 510 is configured to obtain first point cloud data of a scene collected by the laser radar in an automatic driving mobile carrier, and first pose data collected by the navigation positioning system in the automatic driving mobile carrier.

The relative pose determining module 520 is configured to determine the relative pose between the laser radar and the navigation positioning system based on the first point cloud data, the first pose data, second point cloud data pre-collected by a laser scanner in the scene and second pose data pre-collected by a positioning device in the scene.

With the technical solution provided in embodiments of the present disclosure, by taking the second point cloud data collected by the laser scanner in the scene and the second pose data collected by the positioning device in the scene as a reference, and based on a correspondence relationship between the first point cloud data collected by the laser radar in the automatic driving mobile carrier, the second point cloud data, the first pose data collected by the navigation positioning system in the automatic driving mobile carrier and the second pose data, the relative pose between the laser radar and the navigation positioning system may be determined. In this way, the relative pose between the laser radar and the navigation positioning system may be calibrated accurately, and a new method is provided for calibrating the relative pose between the laser radar and the navigation positioning system.

For example, the relative pose determining module 520 may include a third point cloud determining unit and a relative pose determining unit.

The third point cloud determining unit is configured to convert first point cloud data of space points in the scene in a laser radar coordinate system to a laser scanner coordinate system based on a relative pose parameter between the laser radar and the navigation positioning system, first converted pose data of the navigation positioning system in a global coordinate system, and second converted pose data of the laser scanner in the global coordinate system, to obtain third point data of the space points in the scene in the laser scanner coordinate system.

The relative pose determining unit is configured to match the third point cloud data of the space points in the scene in the laser scanner coordinate system with the second point cloud data collected by the laser scanner in the scene, and to determine the relative pose between the laser radar and the navigation positioning system based on a matching result.

For example, the relative pose determining unit is configured to:

build a matching energy function based on a matching relationship between third point cloud data and second point cloud data of each space point in the scene at different time points; and perform a minimization process on the matching energy function, to determine the relative pose between the laser radar and the navigation positioning system.

For example, the above apparatus may further include a second pose determining module.

The second pose determining module is configured to determine the second converted pose data of the laser scanner in the global coordinate system according to the second pose data collected by the positioning device in the positioning device coordinate system, and the relative pose between the positioning device and the laser scanner.

For example, the relative pose determining unit may include a coincidence point set determining sub-unit and a height difference determining sub-unit.

The coincidence point set determining sub-unit is configured to match the third point cloud data of the spaces point in the scene in the laser scanner coordinate system with the second point cloud data collected by the laser scanner in the scene, to determine a coincidence point set between the third point cloud data and the second point cloud data.

The height difference determining sub-unit is configured to determine a height difference between the laser radar and the navigation positioning system according to first converted pose data associated with the coincidence point set and second converted pose data associated with the coincidence point set.

For example, the coincidence point set determining sub-unit is configured to:

perform three-dimensional scene rebuilding on the third point cloud data to obtain a first scene image, and segment the first scene image to obtain a first road surface;

perform three-dimensional scene rebuilding on the second point cloud data to obtain a second scene image, and segment the second scene image to obtain a second road surface; and determine a coincidence point set between the first road surface and the second road surface as the coincidence point set between the third point cloud data and the second point cloud data.

Embodiment 6

Figure 6:
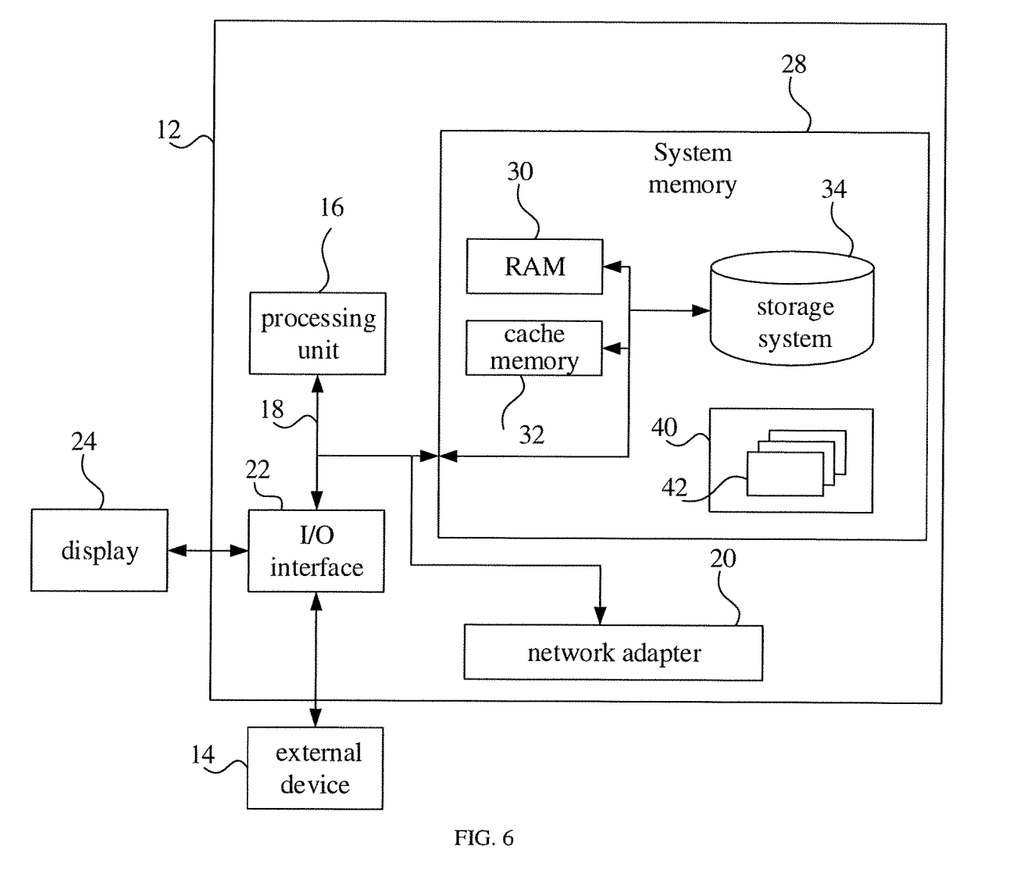
FIG. 6 is a schematic diagram illustrating a device in Embodiment 6 of the present disclosure.

FIG. 6 is a schematic diagram illustrating a device provided in Embodiment 6 of the present disclosure. FIG. 6 illustrates a block diagram of an exemplary device 12 applicable to implement embodiments of the present disclosure. The device 12 illustrated in FIG. 6 is only an example, which may not bring any limitation to functions and scope of embodiments of the present disclosure.

As illustrated in FIG. 6, the device 12 is embodied in the form of a general-purpose computing device. Components of the device 12 may include but not limited to: one or more processors or processing units 16, a system memory 28, and a bus 18 connecting different system components (including the system memory 28 and the processing unit 16).

The bus 18 represents one or more of several bus structures, including a storage bus or a storage controller, a peripheral bus, an accelerated graphics port and a processor or a local bus with any bus structure in the plurality of bus structures. For example, these architectures include but not limited to an industry standard architecture (ISA) bus, a micro channel architecture (MAC) bus, an enhanced ISA bus, a video electronics standards association (VESA) local bus and a peripheral component interconnection (PCI) bus.

The device 12 typically includes a plurality of computer system readable mediums. These mediums may be any usable medium that may be accessed by the device 12, including volatile and non-volatile mediums, removable and non-removable mediums.

The system memory 28 may include computer system readable mediums in the form of volatile medium, such as a random access memory (RAM) 30 and/or a cache memory 32. The device 12 may further include other removable/non-removable, volatile/non-volatile computer system storage mediums. Only as an example, the storage system 34 may be configured to read from and write to non-removable, non-volatile magnetic mediums (not illustrated in FIG. 6, and usually called "a hard disk driver"). Although not illustrated in FIG. 6, a magnetic disk driver configured to read from and write to the removable non-volatile magnetic disc (such as "a diskette"), and an optical disc driver configured to read from and write to a removable non-volatile optical disc (such as a CD-ROM, a DVD-ROM or other optical mediums) may be provided. Under these circumstances, each driver may be connected with the bus 18 by one or more data medium interfaces. The system memory 28 may include at least one program product. The program product has a set of program modules (for example, at least one program module), and these program modules are configured to execute functions of respective embodiments of the present disclosure.

A program/utility tool 40, having a set (at least one) of program modules 42, may be stored in the system memory 28. Such program modules 42 include but not limited to an operating system, one or more application programs, other program modules, and program data. Each or any combination of these examples may include an implementation of a networking environment. The program module 42 usually executes functions and/or methods described in embodiments of the present disclosure.

The device 12 may communicate with one or more external devices 14 (such as a keyboard, a pointing device, and a display 24), may also communicate with one or more devices enabling a user to interact with the device 12, and/or may communicate with any device (such as a network card, and a modem) enabling the device 12 to communicate with one or more other computing devices. Such communication may occur via an Input/Output (I/O) interface 22. Moreover, the device 12 may also communicate with one or more networks (such as local area network (LAN), wide area network (WAN) and/or public network, such as Internet) via a network adapter 20. As illustrated in FIG. 6, the network adapter 20 communicates with other modules of the device 12 via the bus 18. It should be understood that, although not illustrated in FIG. 6, other hardware and/or software modules may be used in combination with the device 12, including but not limited to: microcode, device drivers, redundant processing units, external disk drive arrays, RAID (redundant array of independent disks) systems, tape drives, and data backup storage systems, etc.

The processor 16, by operating programs stored in the system memory 28, executes various function applications and data processing, for example implements a method for calibrating a relative pose between a laser radar and a navigation positioning system provided in embodiments of the present disclosure.

Embodiment 7

Embodiment 7 of the present disclosure provides a computer readable storage medium having a computer program stored thereon. The computer program implements a method for calibrating a relative pose between a laser radar and a navigation positioning system provided in embodiments of the present disclosure when executed by a processor.

The computer storage medium may employ any combination of one or more computer readable mediums. The computer readable medium may be a computer readable signal medium or a computer readable storage medium. The computer readable storage medium may be, for example, but not limited to an electronic, magnetic, optical, electromagnetic, infrared, or semiconductor system, apparatus or device, or any suitable combination of the foregoing. More specific examples (a non-exhaustive list) of the computer readable storage medium may include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical memory device, a magnetic memory device, or any appropriate combination of the foregoing. In this document, the computer readable storage medium can be any tangible medium that contains or stores a program. The program can be used by or in conjunction with an instruction execution system, apparatus or device.

The computer readable signal medium may include a data signal transmitted in the baseband or as part of a carrier, in which computer readable program codes are carried. The transmitted data signal may employ a plurality of forms, including but not limited to an electromagnetic signal, a light signal or any suitable combination thereof. The computer readable signal medium may also be any computer readable medium other than the computer readable storage medium. The computer readable medium may send, propagate or transmit programs configured to be used by or in combination with an instruction execution system, apparatus or device.

The program codes included in the computer readable medium may be transmitted by any appropriate medium, including but not limited to wireless, electric wire, optical cable, RF (Radio Frequency), or any suitable combination of the foregoing.

The computer program codes for executing operations of the present disclosure may be programmed using one or more programming languages or the combination thereof. The programming languages include object-oriented programming languages, such as Java, Smalltalk, C++, and also include conventional procedural programming languages, such as the C programming language or similar programming languages. The program codes may be executed entirely on a user computer, partly on the user computer, as a stand-alone software package, partly on the user computer and partly on a remote computer, or entirely on the remote computer or server. In the scenario involving the remote computer, the remote computer may be connected to the user computer through any type of network, including a local area network (LAN) or a wide area network (WAN), or may be connected to an external computer (for example, through the Internet using an Internet service provider).

The above is only an optimal embodiment of the present disclosure and technical principle applied thereto. It should be understood by the skilled in the art that, the present disclosure is not limited to the specific embodiment described herein. The skilled in the art may make various obvious changes, modifications and alternatives without departing from the scope of the present disclosure. Therefore, although a detailed illumination is made to the present disclosure by the above embodiments, the present disclosure is not merely limited to the above embodiments. More other equivalent embodiments may also be included without departing from the technical idea of the present disclosure. The scope of the present disclosure is determined by the appended claims.

What is claimed is:

1. A method for calibrating a relative pose between a laser radar and a navigation positioning system, comprising:
    obtaining first point cloud data of a scene collected by the laser radar in an automatic driving mobile carrier and first pose data collected by the navigation positioning system in the automatic driving mobile carrier; and
    determining the relative pose between the laser radar and the navigation positioning system based on the first point cloud data, the first pose data, second point cloud data pre-collected by a laser scanner in the scene and second pose data pre-collected by a positioning device in the scene;
    wherein determining the relative pose between the laser radar and the navigation positioning system based on the first point cloud data, the first pose data, the second point cloud data pre-collected in the scene by the laser scanner and the second pose data pre-collected in the scene by the positioning device comprises:
    converting the first point cloud data of space points in the scene in a laser radar coordinate system to third point data of the space points in the scene in a laser scanner coordinate system based on a relative pose parameter between the laser radar and the navigation positioning system, first converted pose data of the navigation positioning system in a global coordinate system, and second converted pose data of the laser scanner in the global coordinate system; and
    matching the third point cloud data of the space points in the scene in the laser scanner coordinate system with the second point cloud data collected in the scene by the laser scanner, and determining the relative pose between the laser radar and the navigation positioning system based on a result of the matching.

2. The method of claim 1, wherein, matching the third point cloud data of the space points in the scene in the laser scanner coordinate system with the second point cloud data collected in the scene by the laser scanner, and determining the relative pose between the laser radar and the navigation positioning system based on the result of the matching comprises:
    building a matching energy function based on a matching relationship between the third point cloud data and the second point cloud data of the space points in the scene at different time points; and
    performing a minimization process on the matching energy function, to determine the relative pose between the laser radar and the navigation positioning system.

3. The method of claim 1, wherein, the second converted pose data of the laser scanner in the global coordinate system is determined by:
  determining the second converted pose data of the laser scanner in the global coordinate system according to the second pose data collected by the positioning device in the scene and in the positioning device coordinate system and a relative pose between the positioning device and the laser scanner.

4. The method of claim 1, wherein, matching the third point cloud data of the space points in the scene in the laser scanner coordinate system with the second point cloud data collected in the scene by the laser scanner, and determining the relative pose between the laser radar and the navigation positioning system based on the result of the matching, comprises:
  matching the third point cloud data of the space points in the scene in the laser scanner coordinate system with the second point cloud data collected by the laser scanner in the scene, to determine a coincidence point set between the third point cloud data and the second point cloud data; and
  determining a height difference between the laser radar and the navigation positioning system according to first converted pose data associated with the coincidence point set and second converted pose data associated with the coincidence point set.

5. The method of claim 4, wherein, matching the third point cloud data of the space points in the scene in the laser scanner coordinate system with the second point cloud data collected in the scene by the laser scanner, and determining the coincidence point set between the second point cloud data and the second point cloud data comprises:
  performing three-dimensional scene rebuilding on the third point cloud data to obtain a first scene image, and segmenting the first scene image to obtain a first road surface;
  performing three-dimensional scene rebuilding on the second point cloud data to obtain a second scene image, and segmenting the second scene image to obtain a second road surface; and
  determining a coincidence point set between the first road surface and the second road surface as the coincidence point set between the third point cloud data and the second point cloud data.

6. A device, comprising:
  one or more processors; and
  a storage device, configured to store one or more programs;
  wherein, when the one or more programs are executed by the one or more processors, the one or more processors are caused to implement a method for calibrating a relative pose between a laser radar and a navigation positioning system, the method comprising:
  obtaining first point cloud data of a scene collected by the laser radar in an automatic driving mobile carrier and first pose data collected by the navigation positioning system in the automatic driving mobile carrier; and
  determining the relative pose between the laser radar and the navigation positioning system based on the first point cloud data, the first pose data, second point cloud data pre-collected by a laser scanner in the scene and second pose data pre-collected by a positioning device in the scene;
  wherein determining the relative pose between the laser radar and the navigation positioning system based on the first point cloud data, the first pose data, the second point cloud data pre-collected in the scene by the laser scanner and the second pose data pre-collected in the scene by the positioning device comprises:
  converting the first point cloud data of space points in the scene in a laser radar coordinate system to third point data of the space points in the scene in a laser scanner coordinate system based on a relative pose parameter between the laser radar and the navigation positioning system, first converted pose data of the navigation positioning system in a global coordinate system, and second converted pose data of the laser scanner in the global coordinate system; and
  matching the third point cloud data of the space points in the scene in the laser scanner coordinate system with the second point cloud data collected in the scene by the laser scanner, and determining the relative pose between the laser radar and the navigation positioning system based on a result of the matching.

7. The device of claim 6, wherein, matching the third point cloud data of the space points in the scene in the laser scanner coordinate system with the second point cloud data collected in the scene by the laser scanner, and determining the relative pose between the laser radar and the navigation positioning system based on the result of the matching comprises:
  building a matching energy function based on a matching relationship between the third point cloud data and the second point cloud data of the space points in the scene at different time points; and
  performing a minimization process on the matching energy function, to determine the relative pose between the laser radar and the navigation positioning system.

8. The device of claim 6, wherein, the second converted pose data of the laser scanner in the global coordinate system is determined by:
  determining the second converted pose data of the laser scanner in the global coordinate system according to the second pose data collected by the positioning device in the scene and in the positioning device coordinate system and a relative pose between the positioning device and the laser scanner.

9. The device of claim 6, wherein, matching the third point cloud data of the space points in the scene in the laser scanner coordinate system with the second point cloud data collected in the scene by the laser scanner, and determining the relative pose between the laser radar and the navigation positioning system based on the result of the matching, comprises:
  matching the third point cloud data of the space points in the scene in the laser scanner coordinate system with the second point cloud data collected by the laser scanner in the scene, to determine a coincidence point set between the third point cloud data and the second point cloud data; and
  determining a height difference between the laser radar and the navigation positioning system according to first converted pose data associated with the coincidence point set and second converted pose data associated with the coincidence point set.

10. The device of claim 9, wherein, matching the third point cloud data of the space points in the scene in the laser scanner coordinate system with the second point cloud data collected in the scene by the laser scanner, and determining the coincidence point set between the second point cloud data and the second point cloud data comprises:

performing three-dimensional scene rebuilding on the third point cloud data to obtain a first scene image, and segmenting the first scene image to obtain a first road surface;

performing three-dimensional scene rebuilding on the second point cloud data to obtain a second scene image, and segmenting the second scene image to obtain a second road surface; and determining a coincidence point set between the first road surface and the second road surface as the coincidence point set between the third point cloud data and the second point cloud data.

11. A medium having a computer program stored thereon that, when executed by a processor, a method for calibrating a relative pose between a laser radar and a navigation positioning system is implemented, the method comprising:

obtaining first point cloud data of a scene collected by the laser radar in an automatic driving mobile carrier and first pose data collected by the navigation positioning system in the automatic driving mobile carrier; and determining the relative pose between the laser radar and the navigation positioning system based on the first point cloud data, the first pose data, second point cloud data pre-collected by a laser scanner in the scene and second pose data pre-collected by a positioning device in the scene;

wherein determining the relative pose between the laser radar and the navigation positioning system based on the first point cloud data, the first pose data, the second point cloud data pre-collected in the scene by the laser scanner and the second pose data pre-collected in the scene by the positioning device comprises:

converting the first point cloud data of space points in the scene in a laser radar coordinate system to third point data of the space points in the scene in a laser scanner coordinate system based on a relative pose parameter between the laser radar and the navigation positioning system, first converted pose data of the navigation positioning system in a global coordinate system, and second converted pose data of the laser scanner in the global coordinate system; and matching the third point cloud data of the space points in the scene in the laser scanner coordinate system with the second point cloud data collected in the scene by the laser scanner, and determining the relative pose between the laser radar and the navigation positioning system based on a result of the matching.

12. The medium of claim 11, wherein, matching the third point cloud data of the space points in the scene in the laser scanner coordinate system with the second point cloud data collected in the scene by the laser scanner, and determining the relative pose between the laser radar and the navigation positioning system based on the result of the matching comprises:

building a matching energy function based on a matching relationship between the third point cloud data and the second point cloud data of the space points in the scene at different time points; and performing a minimization process on the matching energy function, to determine the relative pose between the laser radar and the navigation positioning system.

13. The medium of claim 11, wherein, the second converted pose data of the laser scanner in the global coordinate system is determined by:

determining the second converted pose data of the laser scanner in the global coordinate system according to the second pose data collected by the positioning device in the scene and in the positioning device coordinate system and a relative pose between the positioning device and the laser scanner.

14. The medium of claim 11, wherein, matching the third point cloud data of the space points in the scene in the laser scanner coordinate system with the second point cloud data collected in the scene by the laser scanner, and determining the relative pose between the laser radar and the navigation positioning system based on the result of the matching, comprises:

matching the third point cloud data of the space points in the scene in the laser scanner coordinate system with the second point cloud data collected by the laser scanner in the scene, to determine a coincidence point set between the third point cloud data and the second point cloud data; and determining a height difference between the laser radar and the navigation positioning system according to first converted pose data associated with the coincidence point set and second converted pose data associated with the coincidence point set.

15. The medium of claim 14, wherein, matching the third point cloud data of the space points in the scene in the laser scanner coordinate system with the second point cloud data collected in the scene by the laser scanner, and determining the coincidence point set between the second point cloud data and the second point cloud data comprises:

performing three-dimensional scene rebuilding on the third point cloud data to obtain a first scene image, and segmenting the first scene image to obtain a first road surface;

performing three-dimensional scene rebuilding on the second point cloud data to obtain a second scene image, and segmenting the second scene image to obtain a second road surface; and determining a coincidence point set between the first road surface and the second road surface as the coincidence point set between the third point cloud data and the second point cloud data.

* * * * *